INVENTOR.
PAUL H. MARSELL,

INVENTOR.
PAUL H. MARSELL,

United States Patent Office 3,453,003
Patented July 1, 1969

3,453,003
MEANS FOR INTERCHANGEABLY SHIFTING FROM LEFT- TO RIGHT-HAND DRIVE
Paul H. Marsell, 100 E. Main St., Box 610,
Cortez, Colo. 81321
Filed Sept. 1, 1967, Ser. No. 665,702
Int. Cl. B62d 1/22, 7/16
U.S. Cl. 280—95                                  2 Claims

ABSTRACT OF THE DISCLOSURE

For use in a vehicle having wheels mounted on kingpins and a linkage connected said kingpins: a bell crank at each side of the vehicle connected to said linkage; a cross link connecting said bell cranks and a link, transferable from one side to the other for connecting either of said bell cranks to an appropriately located steering arm.

---

This invention relates to a mechanism whereby in a given vehicle the steering column readily may be moved from left-hand drive position to right-hand position and back again with a minimum of extra parts and with a minimum of changeover labor.

A truck which is called upon to make numerous deliveries in the larger cities is apt to require a right-hand drive in order that the driver may park at the right-hand curb and emerge from the truck with whatever is to be delivered without the necessity of emerging from the left-hand side into the stream of traffic. Right-hand drive trucks for this purpose are particularly favored by the post office department but are also used to a considerable extent for household milk deliveries and analogous purposes. If it is desired to convert a truck, say, from rural service where left-hand drive is perfectly satisfactory to urban service where right-hand drive is most desirable, it has heretofore been necessary to resort to a very considerable rebuilding job.

It is, therefore, an object of this invention to provide an arrangement by which the steering column can be moved from left-hand position to right-hand position with a minimum of rebuilding in the original installation and with a minimum of mechanical alteration at the time the shift is made from left to right or vice-versa.

The above and other objects will be made clear from the following detailed description taken in connection with the annexed drawings, in which.

Figure 1:
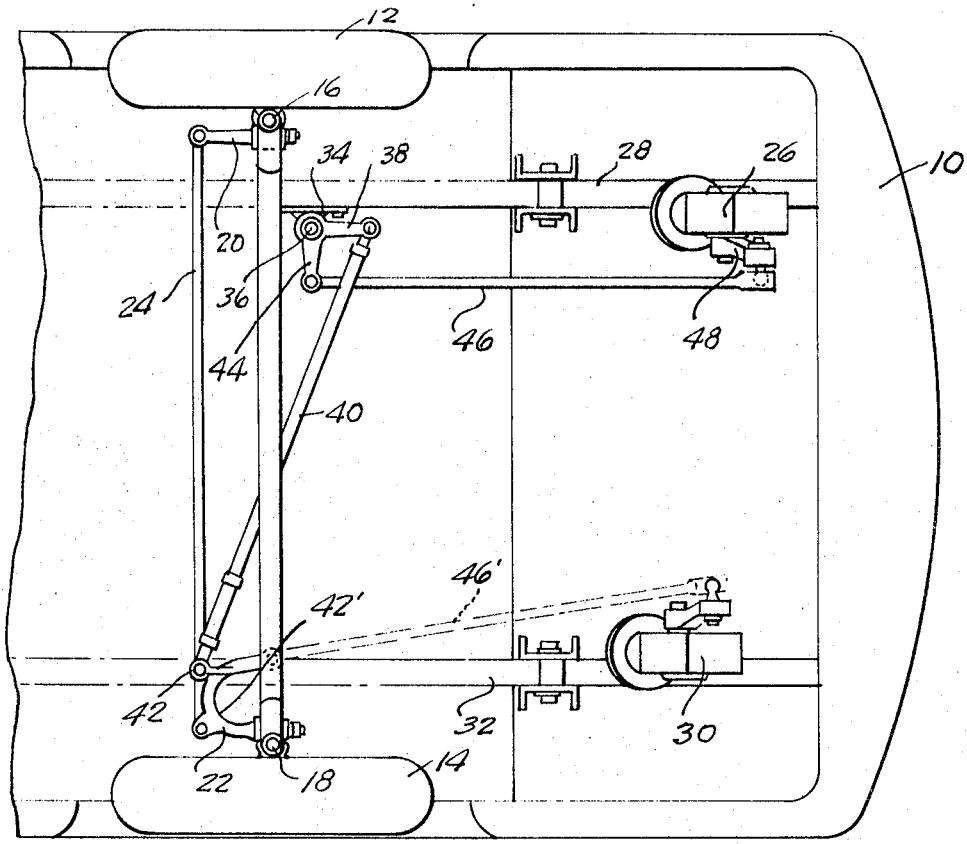
FIGURE 1 is a bottom plan view of a truck in which the improved interchangeable steering gear has been installed.

Referring now to FIGURE 1, the truck is designated generally by the numeral 10 and has a right-hand front wheel 12 and a left-hand front wheel 14. The wheels 12 and 14 are mounted on king pins 16 and 18, respectively. The kingpin 16 has a rearwardly projecting arm 20 while the kingpin 18 has a curved projecting arm 22. The arms 20 and 22 are interconnected by a cross link 24. A conventional steering gear 26 is secured to a right-hand longitudinal frame member 28 of the truck 10, while a similar conventional steering gear 30 is similarly connected to a left-hand longitudinal frame member 32. A lug or boss 34 is secured to the inside of the frame member 28 and in it is mounted a bell crank 36 having one arm 38 secured by an adjustable link 40 to a boss 42 formed on the U-shaped arm 42' of which the arm 22 is a part. The opposite arm 44 of the bell crank 36 is connected by link 46 back to the steering gear 26, where it joins an arm 48 forming a part of that gear.

Figure 2:
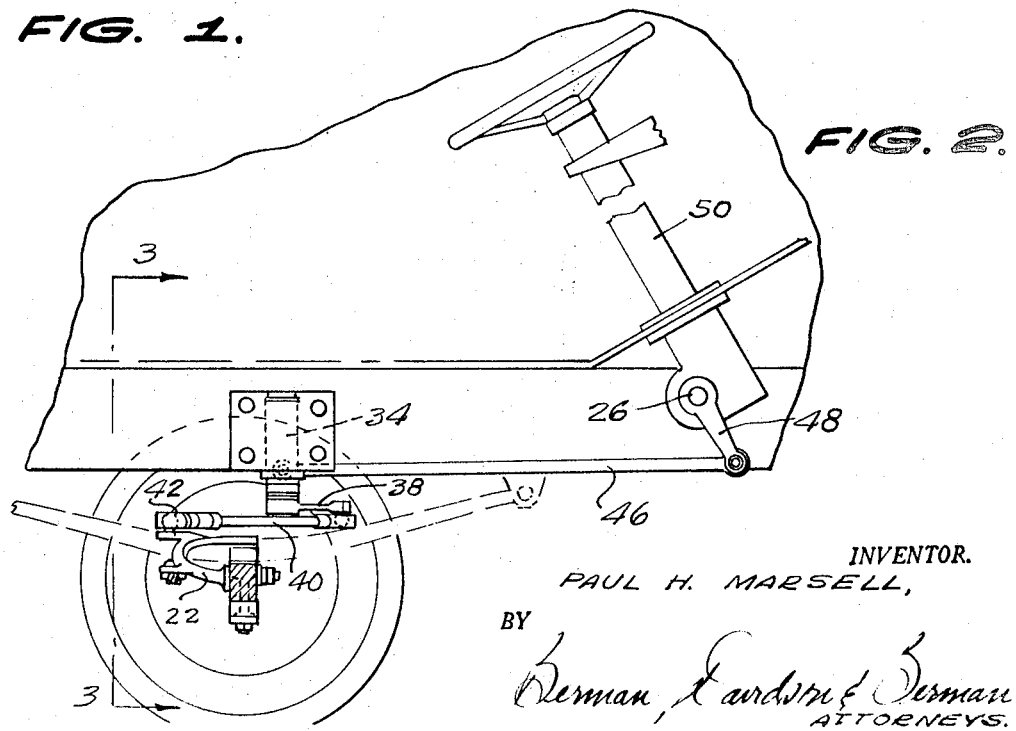
FIGURE 2 shows the vehicle in upright condition and is in elevation from the right-hand side of the vehicle with the steering column in right-hand drive position.
Figure 3:
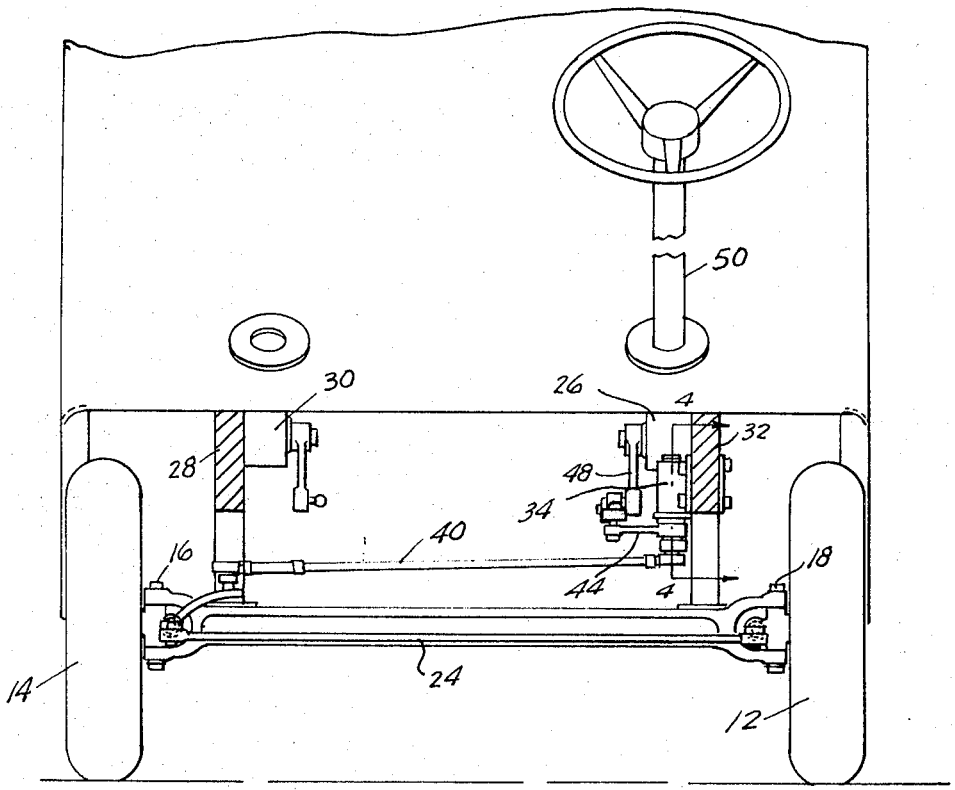
FIGURE 3 is a section on the line 3—3 of FIGURE 2.
Figure 4:
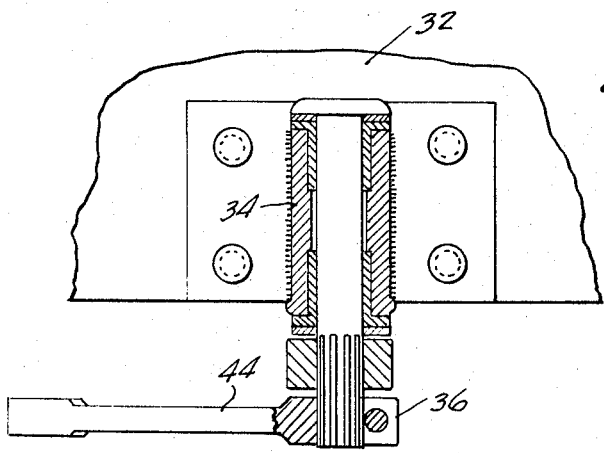
FIGURE 4 is a section on the line 4—4 of FIGURE 3.

FIGURES 2, 3 and 4 further show the relationship of parts.

When it is desired to change a right-hand drive to left-hand drive, it is only necessary to shift the steering column 50 from the position shown in FIGURES 2 and 3 to occupy its right-hand position 52, as shown in FIGURE 3, and under the car it is only necessary to disconnect link 46 from the arms 44 and 48 and transfer it to its dotted line position 46', where it is connected to the U-shaped arm 42' and an arm of the steering gear 30 which is precisely the equivalent to the arm 48 of the steering gear 26. This means that conversion is from right to left and vice-versa. Once the initial installation has been made, conversion is a matter of very little trouble.

Depending on the steering linkages present in the original left-hand drive vehicle, more or less modification of the parts above discussed may be required. The arrangement described and shown, however, will suffice in most cases and in those other cases this disclosure should enable one skilled in the art to adapt the mechanism here disclosed to such conditions.

Accordingly, this invention is not to be limited to the precise details disclosed but only as set forth in the subjoined claims.

What is claimed is:

1. For use in a vehicle having frame members, kingpins journaled in said frame members, axles mounted on said kingpins and wheels journaled on said axles, an arm projecting from each kingpin and a link connecting said arms and pivoted on each, the improvement comprising: an extension of one of said arms defining a pivot point; a bell crank journaled on the frame member opposite the arm having said extension; a second link connecting and pivoted to said extension and to one arm of said bell crank; a second extension of said extension bearing arm, said second extension also defining a pivot point, and a third link alternately pivotable to said second extension or to the remaining arm of said bell crank for connecting the same to steering arms mounted on either of said frame members.

2. The device of claim 1, in which said first and second extensions comprise a single U-shaped arm.

References Cited

UNITED STATES PATENTS

| | | | |
|---|---|---|---|
| 1,299,348 | 4/1919 | Jacobs et al. | 280—96 |
| 1,588,395 | 6/1926 | Winn | 74—498 |
| 1,831,405 | 11/1931 | Bacon | 180—77 |
| 2,508,686 | 5/1950 | Rice | 280—95 |
| 2,707,109 | 4/1955 | Umstott | 280—95 |
| 2,901,264 | 8/1959 | Hart | 280—91 |

KENNETH H. BETTS, *Primary Examiner.*